US012309553B2

(12) United States Patent
Monti et al.

(10) Patent No.: US 12,309,553 B2
(45) Date of Patent: May 20, 2025

(54) IN-EAR HEARING DEVICE WITH CABLE ASSEMBLY

(71) Applicant: KNOWLES ELECTRONICS, LLC, Itasca, IL (US)

(72) Inventors: Christopher Monti, Elgin, IL (US); Shehab Albahri, Hanover Park, IL (US); Charles King, Oak Park, IL (US); Aviral Joshi, Oak Park, IL (US); Matthew Manley, Crystal Lake, IL (US)

(73) Assignee: KNOWLES ELECTRONICS, LLC, Itasca, IL (US)

(*) Notice: Subject to any disclaimer, the term of this patent is extended or adjusted under 35 U.S.C. 154(b) by 304 days.

(21) Appl. No.: 17/937,296

(22) Filed: Sep. 30, 2022

(65) Prior Publication Data

US 2024/0114300 A1 Apr. 4, 2024

(51) Int. Cl.
*H04R 1/06* (2006.01)
*H04R 25/00* (2006.01)

(52) U.S. Cl.
CPC ........... *H04R 25/60* (2013.01); *H04R 25/609* (2019.05); *H04R 2225/0216* (2019.05)

(58) Field of Classification Search
CPC .. H04R 1/1033; H04R 25/556; H04R 25/607; H04R 25/609; H04R 2225/021; H04R 2225/0216; H04R 2225/57; H01R 35/02; H01R 25/162; H01R 25/16
See application file for complete search history.

(56) References Cited

U.S. PATENT DOCUMENTS 4,727,582 A * 2/1988 de Vries ............... H04R 25/604 381/322
7,421,086 B2 * 9/2008 Bauman ............... H04R 25/652 381/328
7,751,580 B2 * 7/2010 Bauman ............... H04R 25/604 381/330
7,844,065 B2 * 11/2010 von Dombrowski .. H04R 25/48 381/328
8,073,175 B2 * 12/2011 Watanuki ............... H04R 25/65 381/381
8,121,320 B2 * 2/2012 Sjursen .................. H04R 25/60 381/322
8,660,658 B2 * 2/2014 Walsh .................. H04R 25/602 607/136

(Continued)

FOREIGN PATENT DOCUMENTS

CN 1430846 A * 7/2003 ............. H04B 1/385
CN 207835734 U * 9/2018

(Continued)

*Primary Examiner* — Ryan Robinson

(57) ABSTRACT

An in-ear hearing device including an adjustable cable assembly is disclosed. The cable assembly includes a shape-configurable portion between an end portion connected an in-ear unit and a flexible end portion adjustably connected to a behind-the-ear (BTE) unit. The flexible end portion is retractably insertable into a housing of the BTE unit to adjust a length of the cable assembly between the in-ear unit and BTE unit. A cable-retention member of the BTE unit is engageable with the flexible end portion of the cable assembly to fix the cable assembly relative to the BTE unit.

20 Claims, 10 Drawing Sheets

(56) References Cited

U.S. PATENT DOCUMENTS

| | | | | |
|---|---|---|---|---|
| 8,958,589 B2 * | 2/2015 | Ilic | H04R 25/60 | 381/381 |
| 9,204,228 B2 * | 12/2015 | Chan | H04R 25/607 | |
| 10,051,389 B2 * | 8/2018 | Baeriswyl | H04R 25/604 | |
| 2011/0007919 A1 * | 1/2011 | Aquilina | H04R 25/65 | 381/324 |
| 2012/0014547 A1 * | 1/2012 | Sjursen | H04R 25/602 | 381/323 |
| 2013/0259279 A1 * | 10/2013 | Hong | H04R 25/607 | 381/322 |
| 2014/0050343 A1 * | 2/2014 | Bjorstrup | H04R 25/02 | 381/330 |
| 2015/0228268 A1 * | 8/2015 | Chew | G10K 11/22 | 181/129 |
| 2017/0019739 A1 * | 1/2017 | Zhao | H04R 25/60 | |
| 2023/0164501 A1 * | 5/2023 | Daley | H04R 25/65 | 381/324 |
| 2024/0040324 A1 * | 2/2024 | Braband | H04R 25/654 | |

FOREIGN PATENT DOCUMENTS

| | | | | |
|---|---|---|---|---|
| CN | 111148002 A * | 5/2020 | | |
| CN | 210469734 U * | 5/2020 | | |
| EP | 2117258 A1 * | 11/2009 | H04R 25/608 | |
| KR | 102491199 B1 * | 1/2023 | | |

* cited by examiner

IN-EAR HEARING DEVICE WITH CABLE ASSEMBLY

FIELD OF THE DISCLOSURE

The present disclosure relates generally to ear-worn hearing devices and more particularly to in-ear hearing devices comprising an in-ear hearing component connectable to a base component by an electrical cable assembly, electrical cable assemblies for in-ear hearing device components, and combinations thereof.

BACKGROUND

Some ear-worn hearing devices comprise multiple components connected by an electrical cable assembly. One such hearing device is a receiver-in-canal (RIC) type behind-the-ear (BTE) hearing aid comprising a BTE unit that sits behind a user's ear (pinna) and a RIC unit configured for at least partial insertion into the user's ear canal. The BTE unit contains one or more microphones, batteries and electrical circuits for converting sensed environmental sounds into amplified electrical audio signals. The electrical circuit can also perform audio signal processing functions like noise suppression and sound localization, among others. The RIC unit includes a sound-producing balanced armature receiver (also referred to herein as a "receiver") integrated with an electrical cable assembly comprising a connector that plugs into the BTE unit for transmission of audio signals from the BTE unit to the RIC unit. The electrical cable assembly generally comprises multiple wires disposed within a tube-shaped cable that extends between the BTE unit and the user's ear canal. The cable assemblies of medical RIC units are typically provided in several different lengths to accommodate variations in human anatomy. This requires hearing aid vendors, like audiologists, to maintain a large inventory of different-length RIC units for each ear. The advent of over-the-counter (OTC) hearing aids will impose this costly inventory burden on vendors of OTC hearing devices. Thus there is an ongoing need for improvements in ear-worn hearing devices comprising components connected by electrical cable assemblies.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

FIGS. 18-19 illustrate a based unit comprising a rotatable battery housing.

Those of ordinary skill in the art will appreciate that the figures are illustrated for simplicity and clarity and therefore may not be drawn to scale and may not include well-known features, that the order of occurrence of actions or steps may be different than the order described or that some or all of the actions or steps may be performed concurrently unless specified otherwise, and that the terms and expressions used herein have meanings understood by those of ordinary skill in the art except where different meanings are attributed to them herein.

DETAILED DESCRIPTION

The disclosure relates generally to ear-worn hearing devices comprising an in-ear hearing component connectable to a base component by an electrical cable assembly, cable assemblies for in-ear components and base components, and combinations thereof. Such components are also referred to herein as "units". The in-ear hearing unit (also referred to herein as an "in-ear unit") can be configured as Receiver-in-Canal (RIC) unit that fits at least partially in the user's ear canal or as a Speaker-in-Concha (SIC) unit that fits at least partially in the user's concha, among other in-ear units. The base unit can be configured as a behind-the-ear (BTE) unit that drapes over or sits behind a user's ear, or as some other base unit to which the in-ear unit is connectable via a cable assembly.

Figure 1:
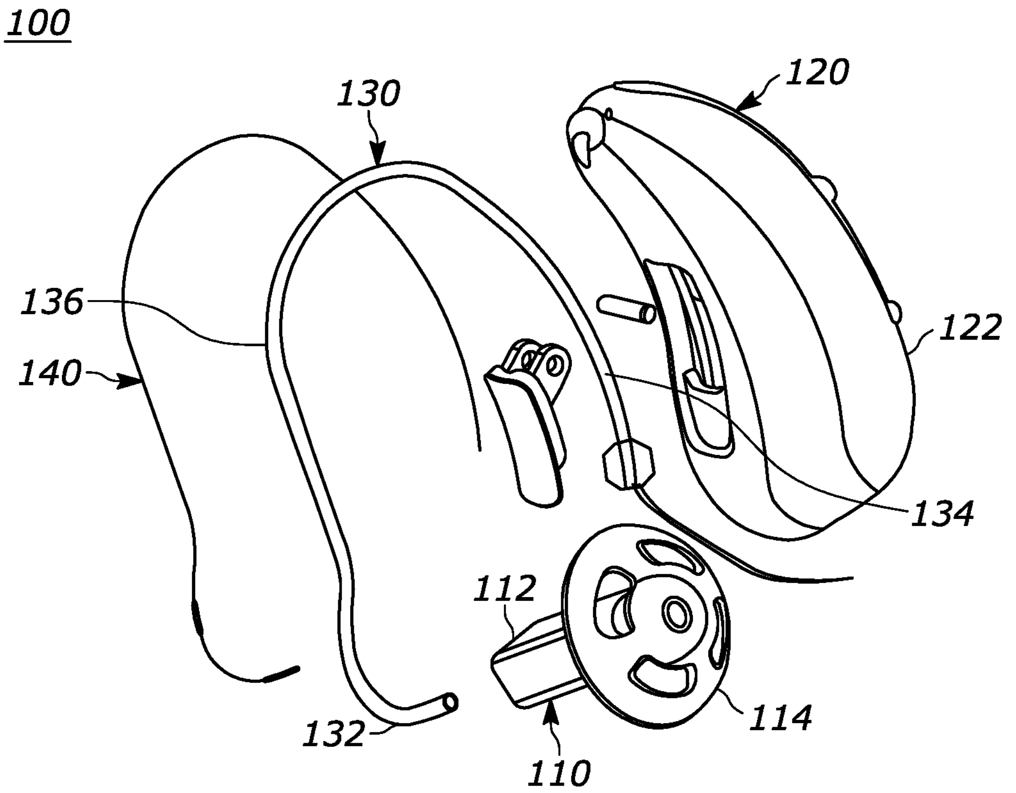
FIG. 1 is an exploded view of an in-ear hearing device.
Figure 2:
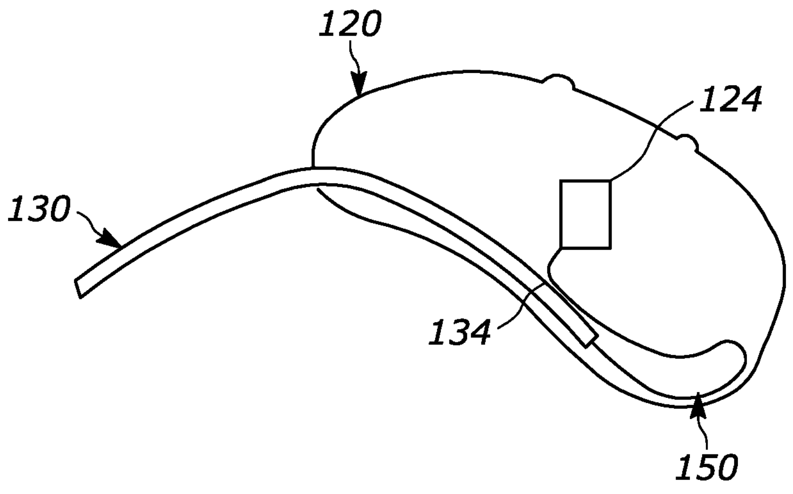
FIG. 2 is a partial sectional view of a BTE unit.
Figure 3:
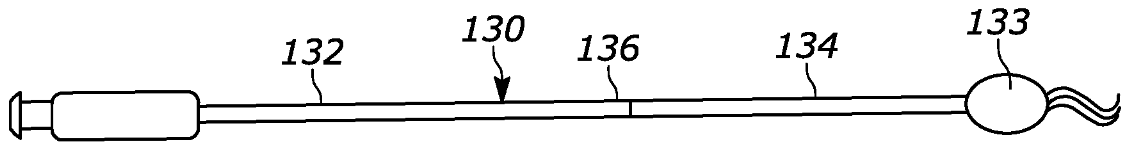
FIGS. 3-6 illustrate representative cable assemblies for an in-ear hearing device.
Figure 4:
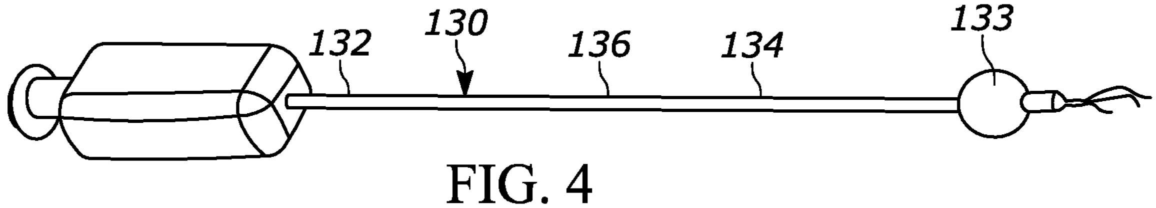
Figure 5:
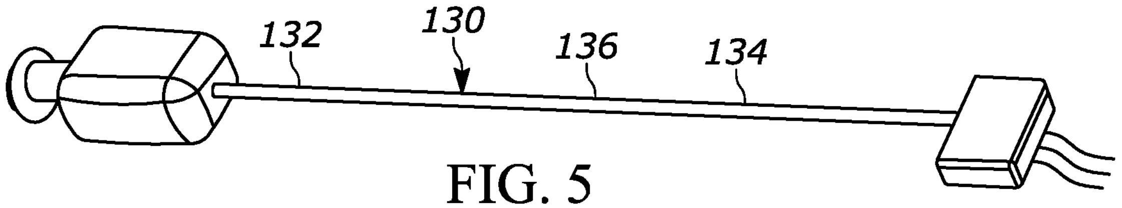

In FIG. 1, an in-ear hearing device 100 generally comprises an in-ear hearing unit 110 connected to a behind-the-ear (BTE) 120 unit by a cable assembly 130. The in-ear unit comprises an acoustic transducer embodied as one or more balanced armature receivers, dynamic speakers or a combination of receivers and speakers. RIC-type in-ear units commonly comprise a canal-interface that fits at least partially in the user's ear canal. In FIG. 1, the canal-interface is a resilient ear dome 114 coupled to the transducer. SIC-type in-ear units can include a resilient concha-interface or other structure that fits at least partially in the concha. The in-ear unit can also comprise a closed or partially-closed housing that retains the transducers and possibly one or more microphones and physiological sensors among other parts. The cable assembly is mechanically and electrically coupled to the transducer or to the housing in embodiments that include a housing. In one implementation, the in-ear unit also comprises the cable assembly integrated with the transducer and any housing. The BTE unit generally comprises a housing 122 shaped to drape partially over or sit behind the user's ear. The housing retains batteries, electrical circuits including an audio signal processor, and one or more microphones. The BTE unit can also include a wireless transceiver and other components. The BTE unit is mechanically and electrically coupled to the cable assembly. In FIG. 2, the cable assembly 130 is electrically connected to the electrical circuit 124 of the BTE unit 120. Representative examples are described further herein.

The cable assembly generally comprises an electrical conductor and a conductor carrier. The electrical conductor can comprise one or more conductors configured as multistranded wire known as a litz wire to reduce loss attributed to the skin-effect and proximity effect when conducting high frequency signals typical of hearing devices. The conductor carrier can be a polymer or other material.

A first end portion of the cable assembly is mechanically and electrically coupled to the acoustic transducer. The cable assembly can be integrated with the in-ear unit. The first end portion of the cable assembly can be rigid relative to other portions of the cable assembly. In one implementation, the cable assembly comprises a fixed-shape segment proximate the acoustic transducer to provide a rigid connection between the cable assembly and the acoustic transducer. A second end portion of the cable assembly is adjustable mechanically and electrically connectable to the base unit. The second end portion of the cable assembly can be flexible relative to other portions of the cable assembly, wherein the second end portion of the cable assembly is sufficiently flexible to permit insertion into, and retraction from, the base or BTE unit. Insertion and retraction of the cable assembly permits adjustment of a length of the cable assembly between the BTE unit and the in-ear unit to accommodate the user's unique anatomy.

The cable assembly also comprises a shape-configurable portion. In FIGS. 1 and 3-6, the cable assembly 130 comprises a first end portion 132 for connection to an acoustic transducer, a second end portion 134 for adjustable connection to the BTE unit, and a shape-configurable portion 136 between the transducer at the first end portion and the base-interface member at the second end portion. The shape-configurable portion can also constitute the first end portion, the second end portion, or both the first and second end portions. The shape-configurable portion can be configured to align the cable assembly between the BTE unit worn behind the user's ear and the in-ear unit worn in the user's ear for a selected length of the cable assembly. In FIG. 1, the shape-configurable portion 136 of the cable assembly 130 is configured with a shape that extends from the BTE unit to the in-ear unit. In some implementations, the conductor carrier is inherently malleable and constitutes the shape-configurable portion without the need for a discrete shape-configurable malleable member described herein.

Figure 28:
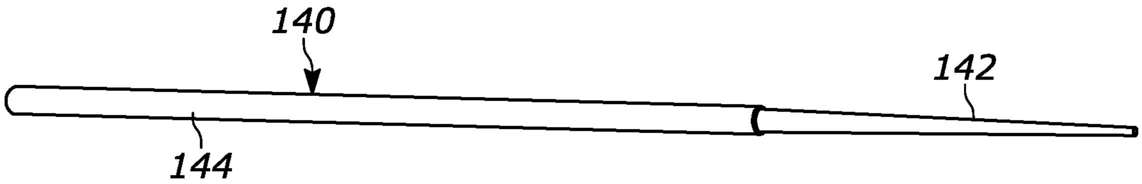
FIG. 28 illustrates a representative shape-retaining malleable member of varying cross section.
Figure 29:
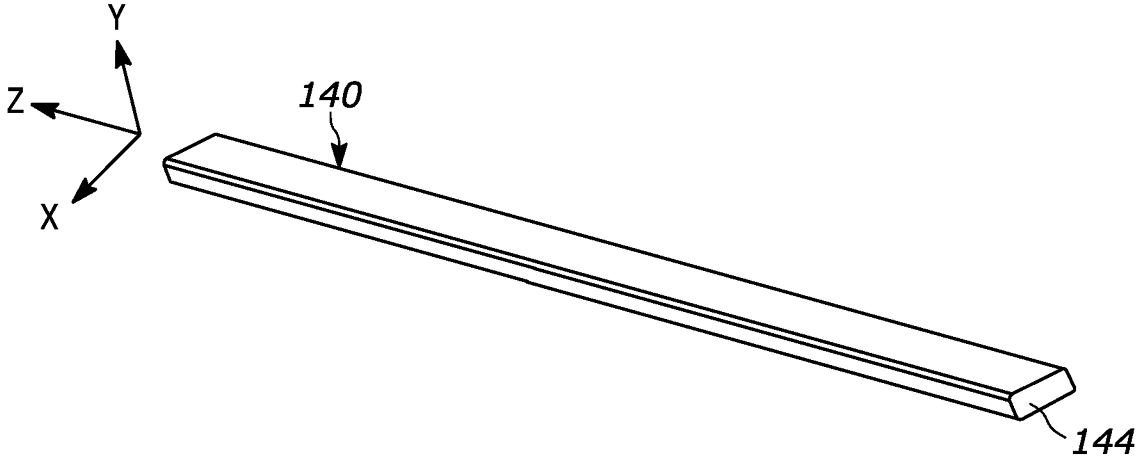
FIGS. 29-30 illustrate representative shape-retaining malleable members with cross sections that have direction-dependent bending properties.
Figure 30:
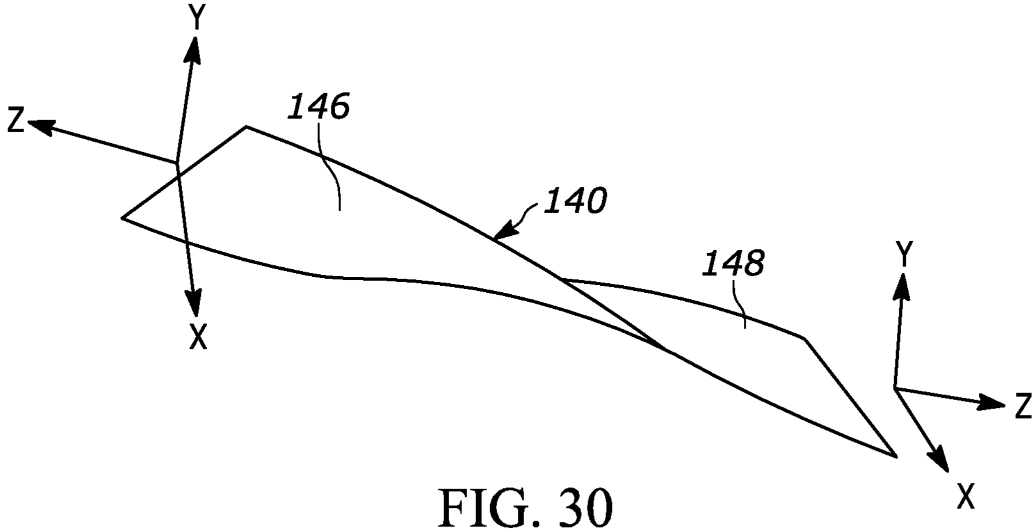

In some implementations, the cable assembly comprises a discrete shape-retaining malleable member disposed along at least a segment of the shape-configurable portion, wherein the shape-retaining malleable member can be manipulated to configure a shape of the shape-configurable portion. The shape-retaining malleable member can extend along the full length of the cable assembly or along only a portion thereof, for example along the shape-configurable portion. The shape-retaining malleable member can be a wire, or a woven tubular metal or other material with shape retaining properties. In FIG. 1, the shape-retaining malleable member is a wire or other member 140 that extends along the cable assembly. A wire comprising a uniform diameter has uniform bending properties and malleability along the axial direction and uniform bending and malleability in planes transverse to the axial direction. In other implementations, a bending and malleability of the shape-retaining malleable member varies along its axial dimension so that different sections of the cable assembly are more or less flexible, more or less malleable, or that their properties are direction dependent. In FIG. 28, for example, the shape-retaining malleable member has a tapered section 142 that has different bending stiffness than a non-tapered section 144. In other implementations, at least a portion of the cable assembly has a first bending stiffness in a first direction and a second bending stiffness in a second direction different than the first direction, the second bending stiffness less than the first bending stiffness. Thus configured the shape-retaining malleable member has greater stiffness one direction than in other directions. Such a configuration can constrain the shape of the cable assembly in one or more directions. Such constraints may facilitate users' configuration of the cable assembly. In FIG. 29, for example, the shape-retaining malleable member 140 comprises a rectangular cross-section 144 that is less stiff in the y-dimension than in the x-dimension. Other sectional shapes can also provide more or less stiffness in one direction or the other. In still other implementations, different sections of the shape-retaining malleable member are more or less stiff in different directions. In FIG. 30, for example, the shape-retaining malleable member 140 comprises a first segment 146 that is less stiff in the x-dimension than in the y-dimension, and a second segment 148 that is less stiff in the y-dimension than in the x-dimension.

Figure 25:
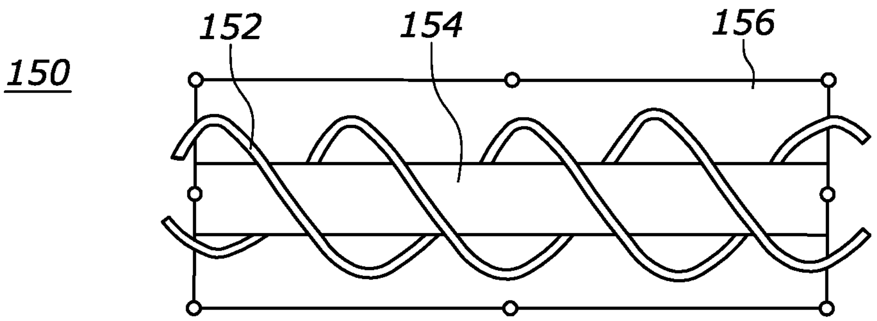
FIGS. 25-27 illustrate representative cable assembly constructions.
Figure 26:
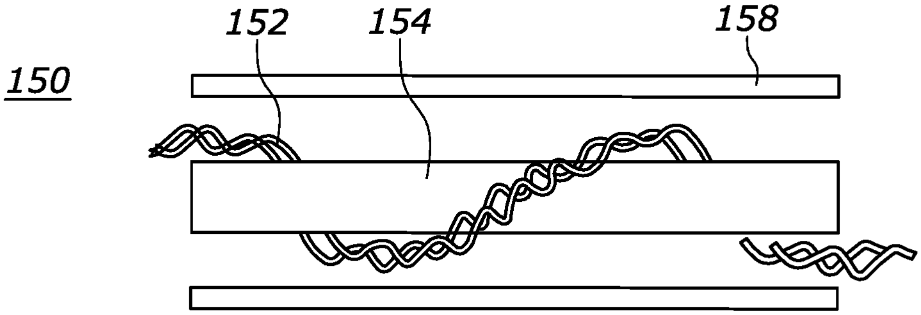
Figure 27:
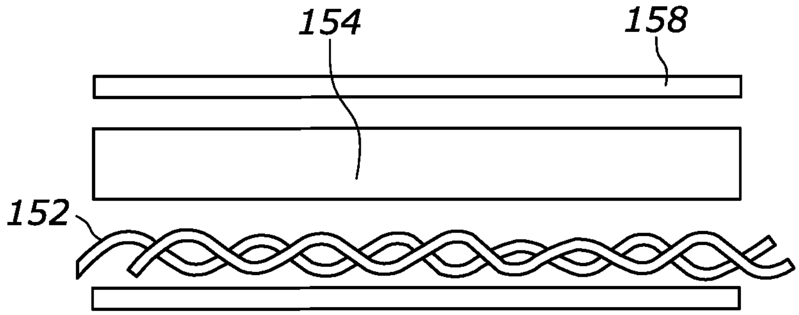

The cable assembly generally comprises an electrical conductor and a conductor carrier and optionally a discrete shape-retaining malleable member. In some implementations, the cable assembly is an extruded assembly. In FIG. 25, for example, an extruded cable assembly 150 comprises one or more electrical conductors 152 and a shape-retaining malleable member 154 embedded in a carrier 156. The conductors are shown wound about the malleable member 154, but in other implementations winding the conductors about the malleable member is not required. In other implementations, the conductor carrier comprises a flexible tube in which the electrical conductor and the malleable member, if any, are located. In FIGS. 26-27, the cable assembly comprises a flexible tube 158 in which the electrical conductors 152 and the malleable member are disposed and retain. In FIG. 26, the electrical conductors 152 are wound about the malleable member 154, and in FIG. 27, the electrical conductors 152 are not wound about the malleable member 154. In other implementations, the shape-retaining malleable member is a woven mesh sheath disposed over an outer surface of the conductor carrier. Alternatively, the malleable member can be a woven mesh tubular member disposed within a tubular conductor carrier.

The in-ear unit also comprises a base-interface member disposed on a second end portion of the cable assembly. The base-interface member is adjustably connectable to the base unit, wherein a length of the cable assembly between the acoustic transducer and the base unit is adjustable by moving the second end portion of the cable assembly into, and out of, an opening of the base unit when the in-ear hearing unit is connected to the base unit. FIGS. 2 and 16-18 show the second end portion of the cable assembly 130 adjustably disposed in the BTE unit 120, wherein the flexible end portion 134 of the cable assembly flexes during insertion and retraction. The base-interface member can be a mechanical interface, an electrical interface, or electromechanical interface. Representative examples are described further herein.

Figure 20:
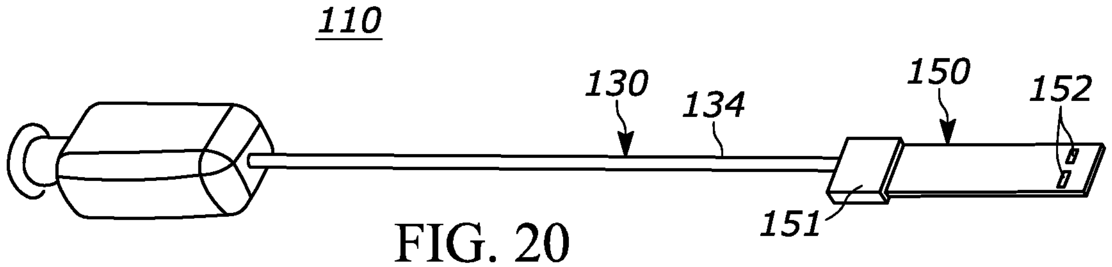
FIGS. 20-21 illustrate representative cable assemblies including a flex harness.
Figure 21:
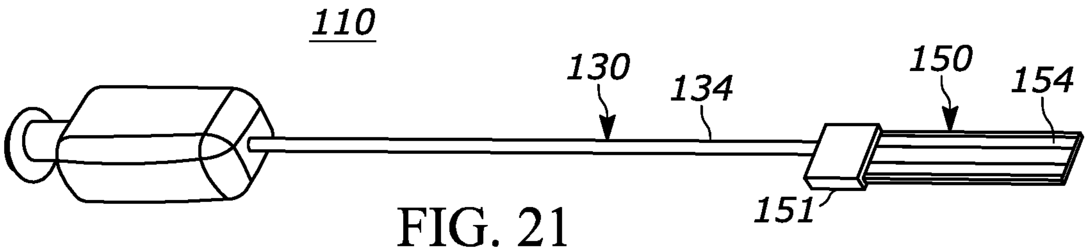

In one implementation, the base-interface member comprises a flex harness having an electrical contact connected to the electrical conductor of the cable assembly, wherein the flex harness constitutes at least part of the flexible end portion of the cable assembly. In FIGS. 20 and 21, the in-ear unit comprises a flex harness coupled to the second end portion 134 of the cable assembly by a flex harness interface 151. The flex harness is located within the housing and flexes in response to insertion and retraction of the cable assembly. The flex harness interface 151 is shaped and sized to prevent separation of the cable assembly from the BTE unit through the aperture of the BTE unit. The flex harness interface can comprise plastic, thermoset adhesive, or other material. It may, for example be over-molded around the round and flex harness portions of the cable assembly.

The flex harness comprises one or more contacts electrically connected to corresponding electrical conductors of the cable assembly. In FIG. 20, the electrical contacts comprise pad contacts 152 electrically connectable to the electrical circuit of the base unit by wires or other conductors soldered or otherwise connected to the contact pads. In FIG. 21, the electrical contacts comprise elongated electrical traces 154 having an exposed surface electrically connectable to an electrical contact of the base unit when the cable assembly is configured for different lengths between the in-ear unit and the base unit.

Figure 22:
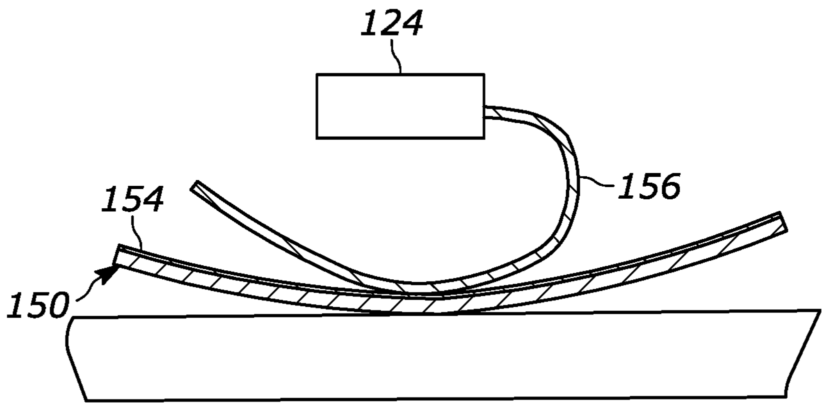
FIGS. 22-24 illustrate representative mechanisms for engaging a flex harness with contacts of the base unit.
Figure 23:
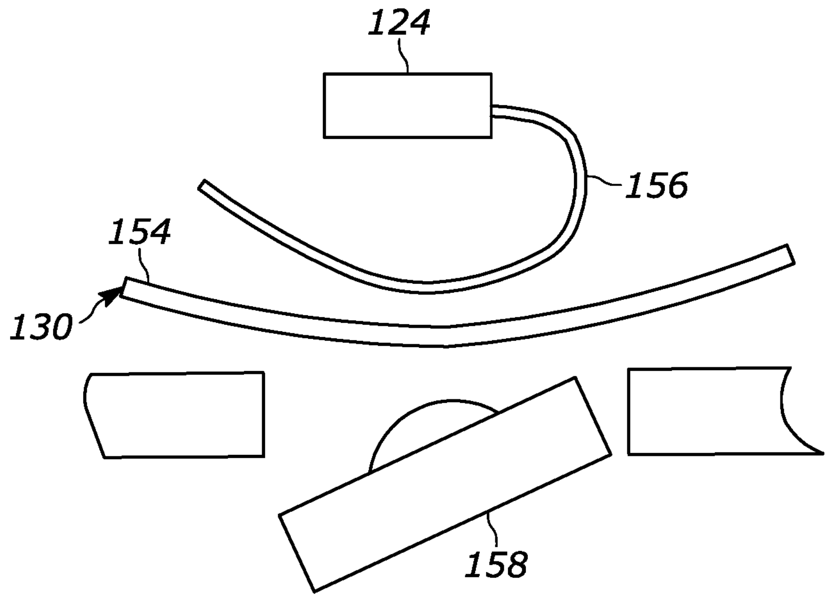
Figure 24:
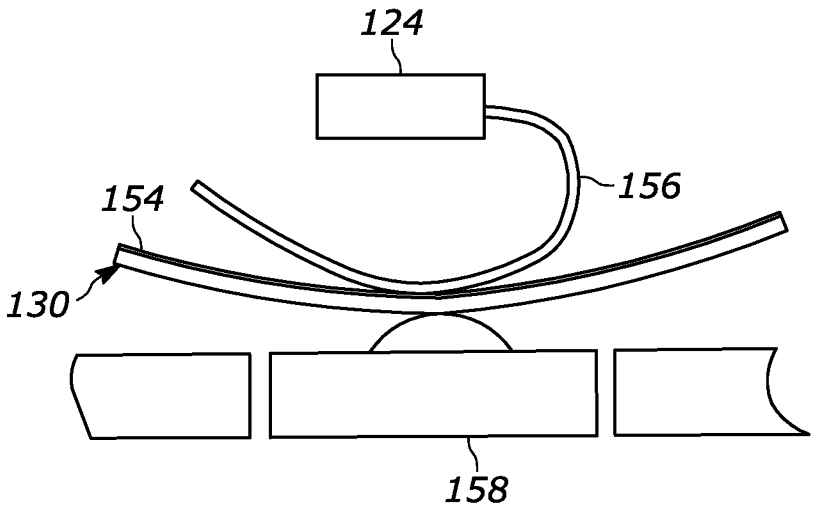

The electrical connection between the electrical contact of the base unit and the elongated electrical traces can be continuous during insertion and retraction of the cable assembly to and from the base unit. In FIG. 22, the base unit comprises a spring contact 156 electrically connected to the electrical circuit 124 of the base unit. The spring contact of the base unit is continuously biased into contact with the elongated electrical trace of the cable assembly, wherein the one or more electrical conductors of the cable assembly are electrically connected to the electrical circuit during insertion and retraction of the cable assembly into and out of the base unit. In another implementation, the base unit comprises an actuator that selectively biases the elongated electrical trace of the flex harness into electrical contact with a contact of the base unit. In FIGS. 23-24, an actuator configured as a pivotal clasp 158 that functions as a switch to make or break an electrical connection between the elongated electrical trace 154 of the flex harness 150 and the spring contact 156 of the base unit. FIG. 23 shows the clasp 158 in the open position so that there is no electrical connection between the cable assembly and the base unit. FIG. 24 shows the clasp 158 in the closed position biasing the elongated electrical trace into contact with the spring contact 156. In FIGS. 23-24, the spring contact 156 can be replaced by a fixed contact. The clasp can be located at least partially on an exterior of the base unit and opened during adjustment of the cable assembly. The clasp can be closed after adjustment of the length of the cable assembly between the in-ear unit and the base unit. The clasp can also include structure that fixes the length of the cable assembly after adjustment as discussed further herein.

The base unit generally comprises a cable-retention member disposed in the base unit housing and engageably biased onto contact with the base-interface member of the cable assembly, wherein the cable assembly is fixed relative to the housing after adjustment of the length of the cable assembly. The bias force is sufficiently strong to adjustably fix the cable assembly relative to the housing upon adjustment of the length of the cable assembly. At the same time, the bias force is sufficiently weak to permit adjustment of the length of the cable assembly without undue force.

Figure 8:
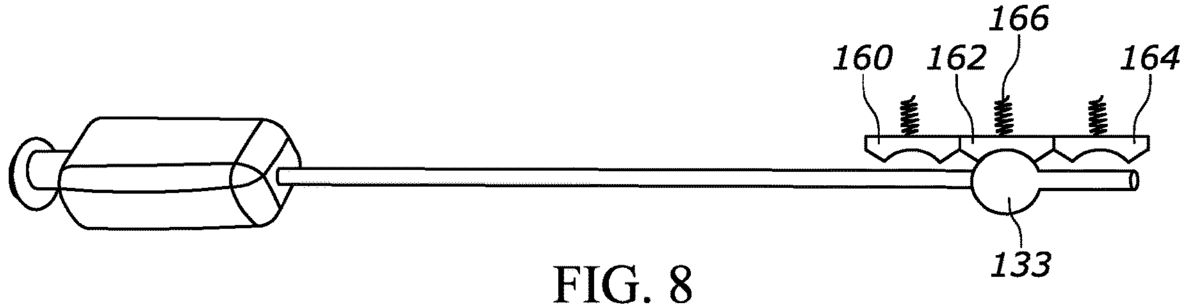
FIG. 8-10 illustrate representative base-interfaces and cable-retention members.

In FIG. 8, the base-interface member comprises a bulge 133 on the second end portion of the cable assembly and the cable-retention member comprises multiple receptacles 160, 162 and 164 are arranged in an array in the base unit. The bulge is movable between multiple receptacles against the bias of a spring 166 acting on the receptacles during adjustment of the length of the cable assembly. In other implementations, another array can be located on an opposite side of the cable assembly, wherein the bulge is captured between receptacles of the opposing arrays.

Figure 9:
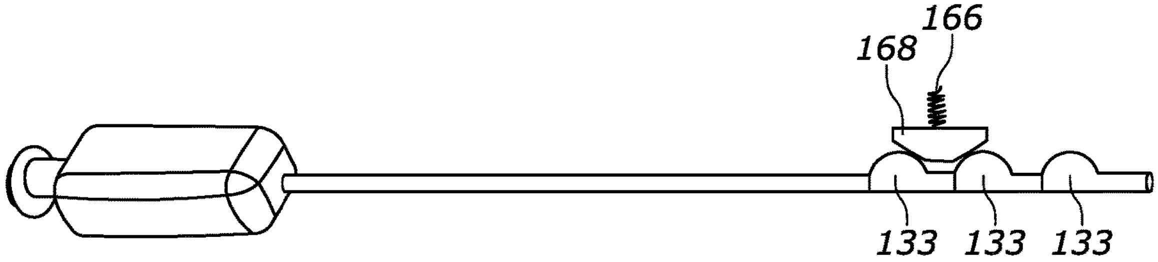
Figure 10:

In FIGS. 9 and 10, the base-interface member comprises multiple bulges 133 on the second end portion of the cable assembly and the cable-retention member comprises a capture device in the base unit. In FIG. 9, a capture device 168 is biased into contact between adjacent bulges of the cable assembly. In FIG. 10, a capture device 168 is biased into contact with a single bulge of the cable assembly. The multiple bulges are movable relative to the capture device against the bias of a spring 166 during adjustment of the length of the cable assembly. In other implementations, another capture device can be located on an opposite side of the cable assembly, wherein the one or more bulges are captured between the opposing capture devices.

Figure 6:
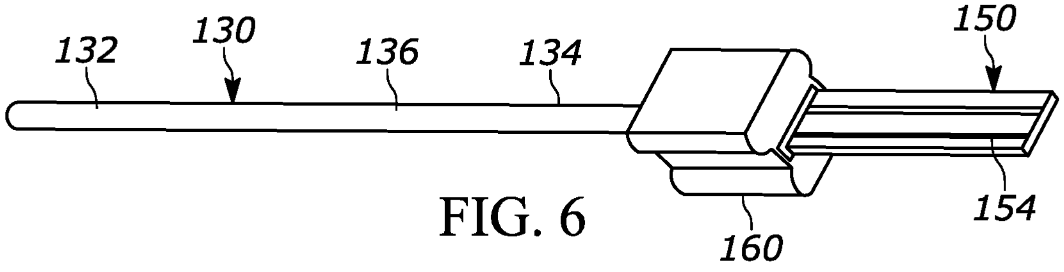
Figure 7:
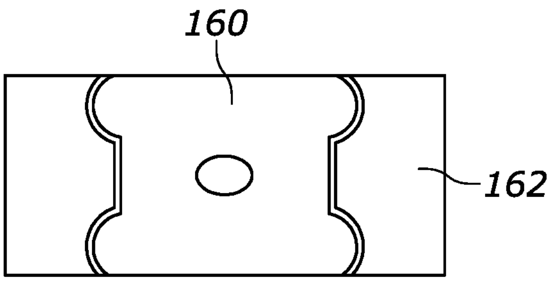
FIG. 7 is a sectional view of a shuttle of the cable assembly of FIG. 6 and shuttle guide of the base unit.

In FIGS. 6 and 7, the base-interface member comprises a shuttle 160 integrated with the second end portion 134 of the cable assembly proximate a flex harness 150. The shuttle is movable along a shuttle guide 162 of the base unit during adjustment of the length of the cable assembly. The shuttle guide guides the second end portion of the cable assembly within the base unit during adjustment of the length of the cable assembly and may also maintain alignment between the flex harness and the spring contacts (shown in FIGS. 22-24) of the base unit during adjustment. In FIGS. 8-10, the bulges 133 can be considered shuttles without a flex cable and the receptacles 162 and capture devices 168 can be considered shuttle guides. The shuttles can also function to prevent extraction and separation of the cable assembly from the base unit after assembly of the base unit housing. Alternatively, the base unit can include a passage that guides a cable assembly devoid of a shuttle during adjustment of the length of the cable assembly and the cable-retention member can act directly on a portion of the cable (also referred to as the "base-interface member") rather than on a bulge or between neighboring bulges.

Figure 11:
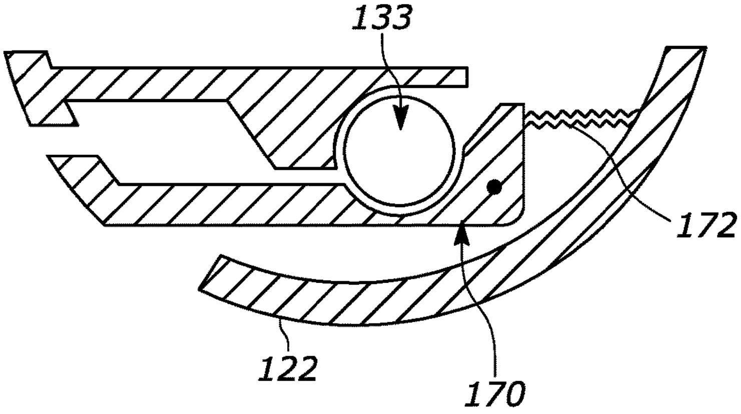
FIGS. 11-15 illustrate representative cable-retention members.
Figure 12:
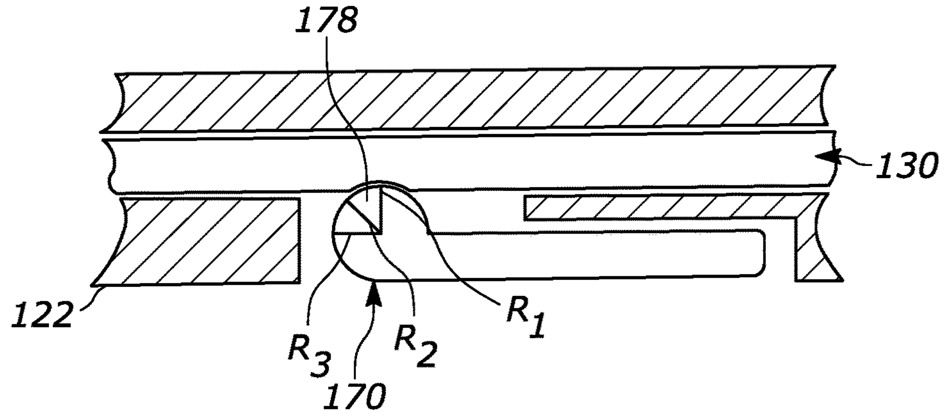
Figure 13:
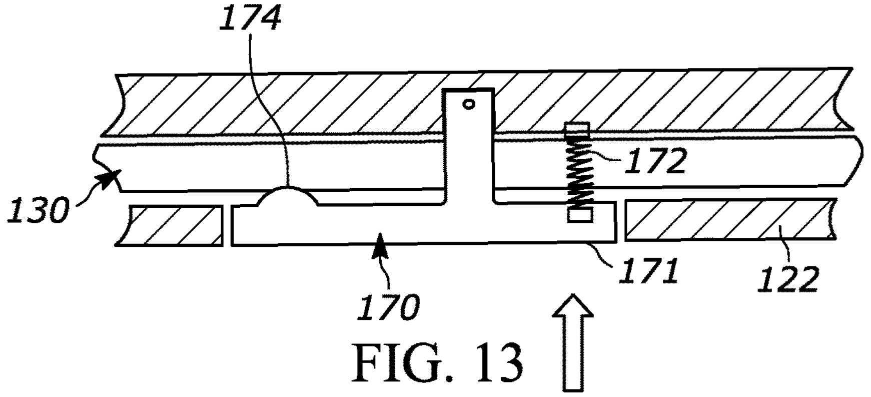

In FIGS. 11 and 13, a cable-retention member 170 clamps a portion of cable assembly 130 under the bias of a spring 172. In FIG. 11, the cable-retention member is the receptacle 162 or the capture device 168 and the portion of the cable assembly clamped by the retention member can be the bulge 133 described herein and shown in FIGS. 8-10. Alternatively, the cable-retention member may engage the cable assembly along a relatively smooth portion of the cable that is free of bulges, wherein the cable-retention member serves only to increase friction applied to the cable assembly, thereby releasably fixing the length of the cable assembly protruding from the base unit. Alternatively, the cable-retention member may releasably engage and apply friction to the flex harness. In FIG. 11, the retention member is a pivotal clasp accessible from an exterior of the base unit housing 122, whereby the cable assembly can be released by pivoting the clasp against the bias of the spring 172 to permit adjustment of the length of the cable assembly. In FIG. 13, the cable-retention member is a clamping portion 174 biased into engagement with the cable assembly 130 by the spring 172. A lever portion 171 accessible from an exterior of the base unit housing 122 can be depressed against the bias of the spring 172 to release the cable assembly for adjustment. The clasp 158 of FIGS. 23 and 24 described above may be configured as shown in FIGS. 11-15 among other known and future configurations.

Figure 15:
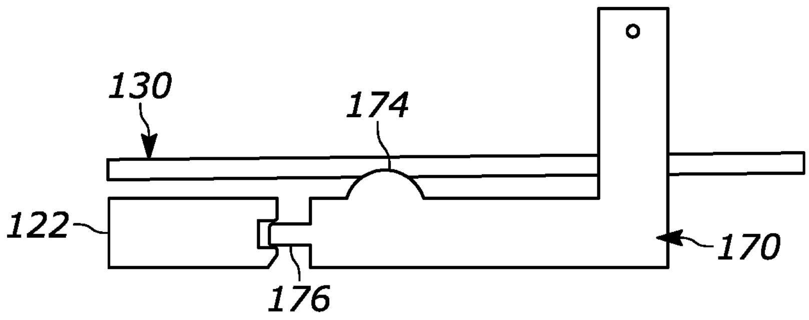

In FIG. 15, the cable-retention member comprises a pivotal lever 170 including a clamping portion 174 that clamps a portion of cable assembly 130 in the absence of a spring bias. The lever can be accessible from an exterior of the housing, not shown, and includes a latch 176 engages a portion of the base unit housing 122.

In FIG. 12, the cable-retention member comprises a pivotal lever 170 including a cam 178 engageable with a portion of cable assembly 130. The cam has a varying radius with $R_1$ greater than $R_2$ greater than $R_3$, wherein $R_1$ applies more friction to the cable assembly than $R_3$. The lever is accessible from an exterior of the base unit housing 122 and is pivotal to a first position (as shown) in which the cam surface clamps the cable assembly to fix the cable assembly relative to the base unit. The lever is pivotal clockwise to a second position in which the cam surface is disengaged or at least sufficiently unclamped from the cable assembly to permit movement of the cable assembly relative to the base unit.

Figure 14:
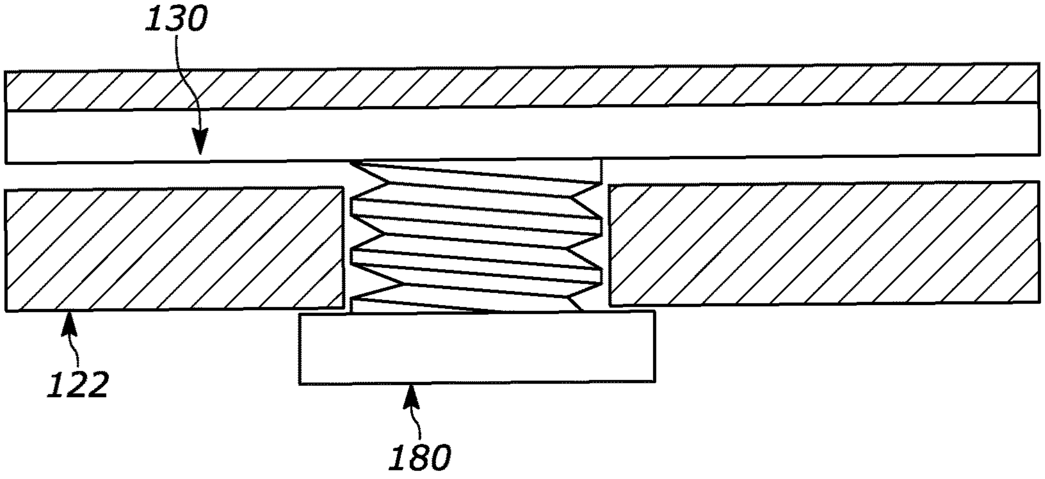

In FIG. 14, the cable-retention member comprises a screw 180 accessible from an exterior of the base unit housing 122. The screw is oriented to clamp the cable assembly upon tightening and to release the cable assembly upon loosening. The screw can be used alone or in combination with other cable-retention members described herein. The screw may engage directly with the cable assembly, or to an intermediate component not shown to reduce damage to the cable assembly. The intermediate component may be constrained from rotating with the screw. One way of constraining the intermediate component would be to make it a flexure that is secured to the housing of the base unit.

Figure 16:
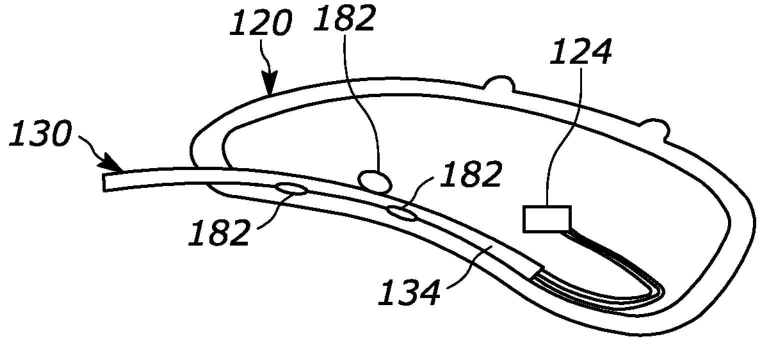
FIGS. 16-18 illustrate sectional views of representative base units.

In FIG. 16, the cable-retention member comprises a serpentine path located within the base unit housing 122 and defined by one or more engagement members 182 between which the flexible end portion 134 of the cable assembly is retractably inserted during adjustment of the length of the cable assembly. The second end portion of the cable assembly is frictionally retained by the one or more engagement members after adjustment of the length of the cable assembly. Alternatively, the cable assembly can also be fixed relative to the base unit by one of other cable-retention members described herein.

Figure 17:
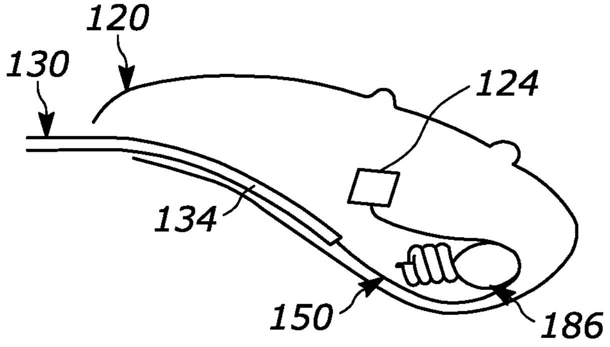

In FIG. 17, the base unit 120 comprises a spring-biased pulley around which a portion of the cable assembly extends. The portion of the cable assembly that extends about the pulley can be a flexible portion of the cable assembly, or a flex circuit, or wires extending from the cable assembly. The pulley takes up slack in the cable assembly when the cable assembly is inserted into the base unit housing. In some implementations, the cable assembly can be fixed relative to the base unit by one of other cable-retention members described herein.

Figure 18:
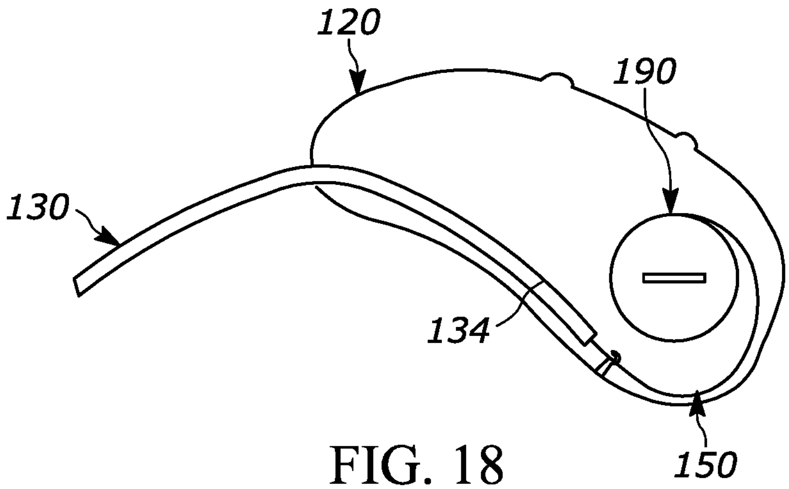
Figure 19:
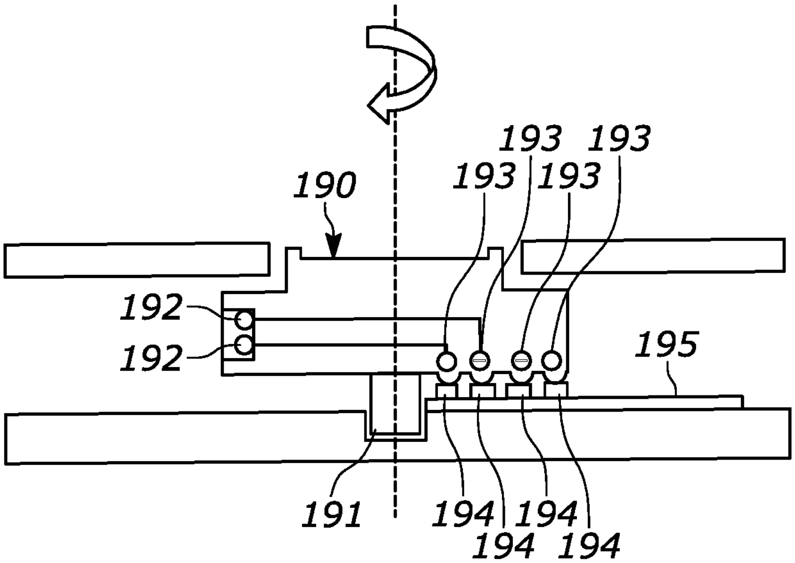

In FIGS. 18-19, the base unit comprises a rotatable battery housing 190 and a portion of the cable assembly is wound about the battery housing. The portion of the cable assembly wound about the battery housing can be a flex circuit 150 or alternatively electrical conductors extending from the cable assembly. In FIG. 19, the battery housing is rotatably mounted on a spindle 191 and the electrical conductors of the cable assembly are connected to contacts 192 on the battery housing. Another set of electrical contacts 193 of the battery housing electrically contact corresponding arcuate contacts 194 on a circuit board 195 as the battery housing rotates. The circuit board contacts are connected to the electrical circuit of the base unit. The battery housing can rotate when the cable assembly is inserted into, and retracted from, the battery housing to coil a portion of the cable assembly. The cable assembly can be fixed relative to the base unit by one of other cable-retention members described herein.

While the disclosure and what is presently considered to be the best mode thereof has been described in a manner establishing possession and enabling those of ordinary skill in the art to make and use the same, it will be understood and appreciated that there are many equivalents to the representative embodiments described herein and that myriad modifications and variations may be made thereto without departing from the scope and spirit of the invention, which is to be limited not by the embodiments described but by the appended claims and their equivalents.

What is claimed is:

1. An in-ear hearing unit connectable to a base unit, the in-ear hearing unit comprising:

an acoustic transducer;

a cable assembly comprising an electrical conductor captured by a conductor carrier, the cable assembly having a shape-configurable portion, a first end portion of the cable assembly mechanically and electrically integrated with the acoustic transducer;

a base-interface member disposed on a second end portion of the cable assembly, the shape-configurable portion of the cable assembly located between the acoustic transducer and the base-interface member, the base-interface member adjustably connectable to the base unit, wherein a length of the cable assembly between the acoustic transducer and the base unit is adjustable by moving the second end portion of the cable assembly into, and out of, an opening of the base unit when the in-ear hearing unit is connected to the base unit.

2. The in-ear hearing unit of claim 1, the cable assembly comprising a shape-retaining malleable member disposed along at least the shape-configurable portion, wherein the shape-retaining malleable member can be manipulated to configure a shape of the shape-configurable portion.

3. The in-ear hearing unit of claim 1, the conductor carrier comprising a flexible tube, a segment of the flexible tube constituting the second end portion of the cable assembly less stiff than other portions of the cable assembly.

4. The in-ear hearing unit of claim 1, the first end portion of the cable assembly comprising a fixed-shape segment proximate the acoustic transducer, and the second end portion of the cable assembly comprising a flexible segment, wherein the shape-configurable portion of the cable assembly is at least a segment of the cable assembly between the fixed-shape segment and the flexible segment.

5. The in-ear hearing unit of claim 1, the base-interface member comprising a flex harness having an elongated electrical trace electrically connected to the electrical conductor of the cable assembly, the elongated electrical trace having an exposed surface electrically connectable to an electrical contact of the base unit when the cable assembly is configured for different lengths.

6. The in-ear hearing unit of claim 5, the base-interface member further comprising a shuttle integrated with the second end portion of the cable assembly proximate the flex harness, the shuttle movable along a shuttle guide of the base unit during adjustment of the length of the cable assembly when the in-ear hearing unit is connected to the base unit.

7. The in-ear hearing unit of claim 1, the base-interface member comprising a bulge integrated with the second end portion of the cable assembly, the bulge movable between multiple receptacles arranged in an array in the base unit and configured to provide movement of the bulge during adjustment of the length of the cable assembly, and the bulge retainable by one of the multiple receptacles after adjustment of the length of the cable assembly.

8. The in-ear hearing unit of claim 1, the base-interface member comprising multiple bulges integrated with, and spaced apart along, the second end portion of the cable assembly, the multiple bulges movable relative to a capture device in the base unit during adjustment of the length of the cable assembly, and at least one of the multiple bulges retainable by the capture device after adjustment of the length of the cable assembly.

9. The in-ear hearing unit of claim 1, wherein at least a portion of the cable assembly has a first bending stiffness in a first direction and a second bending stiffness in a second direction different than the first direction, the second bending stiffness less than the first bending stiffness.

10. The in-ear hearing unit of claim 1 in combination with a base unit configured as a behind-the-ear (BTE) unit comprising an electrical circuit disposed within a housing including an opening into which the second end portion of the cable assembly extends, wherein the base-interface member of the cable assembly is located and retained within the housing and the electrical conductor of the cable assembly is electrically connected to the electrical circuit.

11. An in-ear hearing device comprising:

an in-ear hearing unit comprising an acoustic transducer;

a behind-the-ear (BTE) unit comprising an electrical circuit disposed in a housing;

a cable assembly comprising a shape-configurable portion between a first end portion of the cable assembly coupled to the acoustic transducer and a flexible end portion of the cable assembly opposite the first end portion, the flexible end portion of the cable assembly retractably disposed in the housing through an opening of the housing, an electrical conductor of the cable assembly electrically connected to the acoustic transducer and to the electrical circuit, a length of the cable assembly between the BTE unit and the in-ear hearing unit adjustable by moving the flexible end portion into, and out of, the housing; and a cable-retention member disposed in the housing and engageable with the flexible end portion of the cable assembly, wherein the cable assembly is releasably fixed relative to the housing by the cable-retention member after adjustment of the length of the cable assembly.

12. The in-ear hearing device of claim 11, the cable assembly comprising a shape-retaining malleable member disposed along at least a portion of the shape-configurable portion, wherein the shape-retaining malleable member can be manipulated to adjustably configure a shape of the shape-configurable portion.

13. The in-ear hearing device of claim 11 further comprising a flex harness having an elongated electrical trace electrically connected to the electrical conductor of the cable assembly, the elongated electrical trace having an exposed surface electrically connected or connectable to an electrical contact of the electrical circuit, wherein the flex harness constitutes at least a portion of the flexible end portion of the cable assembly.

14. The in-ear hearing device of claim 13 further comprising a clasp actuatable from an exterior of the housing, the clasp having a first configuration in which the electrical trace of the flex harness and the electrical contact of the electrical circuit are biased into electrical contact, and the clasp having a second configuration in which the electrical trace of the flex harness and the electrical contact of the electrical circuit are not biased into electrical contact.

15. The in-ear hearing device of claim 11, the cable assembly further comprising a bulge on the flexible end portion, the cable-retention member comprising multiple receptacles arranged in an array, the bulge movable along the multiple receptacles during adjustment of the length of the cable assembly, wherein one of the multiple receptacles retains the bulge after adjustment of the length of the cable assembly.

16. The in-ear hearing device of claim 11, the cable assembly further comprising multiple bulges on the flexible end portion, the cable-retention member comprising a capture device, the multiple bulges movable through the capture device during adjustment of the length of the cable assembly, wherein the capture device retains at least one of the multiple bulges after adjustment of the length of the cable assembly.

17. The in-ear hearing device of claim 11, wherein the cable-retention member comprises a serpentine path defined by one or more engagement members between which the flexible end portion of the cable assembly is retractably inserted during adjustment of the length of the cable assembly, wherein the flexible end portion of the cable assembly is retained by the one or more engagement members after adjustment of the length of the cable assembly.

18. The in-ear hearing device of claim 11, wherein the cable-retention member comprises a pivotal lever biased into frictional contact with the flexible end portion of the cable assembly by a spring to fix the cable assembly relative to the BTE unit after adjustment of the length of the cable assembly.

19. The in-ear hearing device of claim 11, wherein the cable-retention member comprises an actuatable cam engageable with the flexible end portion of the cable assembly to fix the cable assembly relative to the BTE unit after adjustment of the length of the cable assembly.

20. The in-ear hearing device of claim 11, wherein the cable-retention member comprises an actuatable screw-clamp engageable with the flexible end portion of the cable assembly to fix the length of the cable assembly after adjustment of the length of the cable assembly.

* * * * *